(12) United States Patent
Hopwood

(10) Patent No.: US 8,604,639 B2
(45) Date of Patent: Dec. 10, 2013

(54) POWER LIMITING CONTROL FOR MULTIPLE DRILLING RIG TOOLS

(75) Inventor: Fergus Hopwood, Houston, TX (US)

(73) Assignee: Omron Oilfield and Marine, Inc., Houston, TX (US)

(*) Notice: Subject to any disclaimer, the term of this patent is extended or adjusted under 35 U.S.C. 154(b) by 453 days.

(21) Appl. No.: 12/868,161

(22) Filed: Aug. 25, 2010

(65) Prior Publication Data

US 2012/0049625 A1    Mar. 1, 2012

(51) Int. Cl.
*H02J 3/00* (2006.01)
*H02J 3/14* (2006.01)

(52) U.S. Cl.
USPC .......................................................... 307/32

(58) Field of Classification Search
USPC .......................................................... 307/32
See application file for complete search history.

(56) References Cited

U.S. PATENT DOCUMENTS

| | | | | |
|---|---|---|---|---|
| 5,414,640 A * | 5/1995 | Seem | ............................. | 700/291 |
| 7,173,347 B2 * | 2/2007 | Tani et al. | ..................... | 307/10.1 |
| 7,308,352 B2 * | 12/2007 | Wang et al. | ....................... | 701/70 |
| 7,356,422 B2 * | 4/2008 | Schweitzer, III | ............... | 702/60 |
| 7,786,617 B2 * | 8/2010 | Paik et al. | ........................ | 307/64 |
| 7,948,113 B2 * | 5/2011 | Abe | ................................ | 307/32 |
| 8,200,370 B2 * | 6/2012 | Paik | .............................. | 700/291 |
| 8,229,602 B2 * | 7/2012 | Montgomery et al. | ....... | 700/295 |
| 8,248,058 B2 * | 8/2012 | Stair et al. | ..................... | 324/133 |
| 8,335,595 B2 * | 12/2012 | Tolnar et al. | .................. | 700/295 |
| 8,415,830 B2 * | 4/2013 | Lim et al. | ........................ | 307/41 |
| 8,441,143 B2 * | 5/2013 | Goodermuth et al. | ......... | 307/9.1 |
| 2006/0157459 A1 * | 7/2006 | Fosbinder | ................ | 219/130.21 |
| 2008/0264922 A1 * | 10/2008 | Fosbinder | ..................... | 219/133 |
| 2010/0010683 A1 * | 1/2010 | Kates | ............................ | 700/293 |
| 2011/0298285 A1 * | 12/2011 | Lim et al. | ........................ | 307/41 |

* cited by examiner

*Primary Examiner* — Adi Amrany
(74) *Attorney, Agent, or Firm* — Murphy, Bilak & Homiller, PLLC

(57) ABSTRACT

A power limiting control system includes at least one power generator configured to provide power to a plurality of tools on a drilling rig; and a power limiting controller configured to control the provision of power from the power generator to the plurality of tools. The power limiting controller is adapted to perform a method including determining an individual power consumption for each of the plurality of tools; calculating a total power consumption from each respective individual power consumption of the plurality of tools; comparing the total power consumption of the plurality of tools to a total available power; ranking each respective individual power consumption by load size; and reducing power consumption of at least one of the plurality of tools based on rank when the total power consumption exceeds the total available power.

16 Claims, 10 Drawing Sheets

POWER LIMITING CONTROL FOR MULTIPLE DRILLING RIG TOOLS

BACKGROUND

1. Field of the Disclosure

Embodiments disclosed herein relate generally to drilling rigs. More particularly, embodiments disclosed herein relate to power limiting control systems on a drilling rig.

2. Background Art

A drilling rig is used to drill a wellbore in a formation. Drilling rigs may be large structures that house equipment used to drill water wells, oil wells, or natural gas extraction wells. Drilling rigs sample sub-surface mineral deposits, test rock, soil and groundwater physical properties, and may also be used to install sub-surface fabrications, such as underground utilities, instrumentation, tunnels or wells. Drilling rigs may be mobile equipment mounted on trucks, tracks, or trailers, or more permanent land or marine-based structures (such as oil platforms). The term "rig," therefore, generally refers to a complex of equipment that is used to penetrate the surface of the earth's crust.

Referring to FIG. 1, a conventional drilling rig 30 is shown. Drilling rig 30 includes a derrick 14, which provides a support structure for a majority of the equipment used to raise and lower a drillstring 25 into and out of a wellbore. The drillstring 25 may be an assembled collection of drillpipe, drill collars, or any other assortment of tools, connected together and run into the wellbore to facilitate the drilling of a well (drillpipe 16 is shown in joints prior to being connected together).

The drillstring 25 may be raised and lowered into and out of the wellbore by the draw-works 7, which includes a spool powered by a motor or other power source 5. A drill line 12, which may be a thick, stranded metal cable, is run from the draw-works 7 over a crown block 13 and down through a travelling block 11. Typically, the crown block 13 remains stationary while the travelling block 11 moves vertically with the drillstring 25. The combination of the crown block 13 and the travelling block 11 provides a significant mechanical advantage for lifting the drillstring 25. Further, a swivel 18 may be attached to the travelling block 11 to allow rotation of the drillstring 25 without twisting the travelling block 11.

The drilling rig 30 further includes a rotary table 20 mounted in a rig floor 21, which is used to rotate the drillstring 25 along with a kelly drive 19. Kelly drive 19, attached at an upper end to the swivel 18 and at a lower end to the drillstring 25, is inserted through the rotary table 20 to rotate the drillstring 25 (drillstring rotation shown by arrow "R"). Kelly drive 19 may be square, hexagonal, or any other polygonal-shaped tubing and is able to move freely vertically while the rotary table 20 rotates it. Alternatively, drilling rig 30 may include a top drive (not shown) in place of kelly drive 19 and rotary table 20. Additionally, blowout preventers ("BOPs") may be located below the rig floor 21 and installed atop a wellhead 27 to prevent fluids and gases from escaping from the wellbore. An annular BOP 23 and one or more ram BOPs 24 are shown and are commonly understood in the art.

During drilling operations, drilling fluid may be circulated through the system to carry cuttings away from the bottom of the wellbore as drilling progresses. Drilling fluid may be stored in mud tanks 1 before being drawn through suction line 3 by mud pumps 4. Drilling fluid (drilling fluid route is indicated by arrows "F") is then pumped from mud pumps 4 through a hose 6, up a stand pipe 8, through a flexible hose 9, and down into the wellbore. Drilling fluid returning from the wellbore is routed through a flow line 28 to shakers 2, which are used to separate drill cuttings from the drilling fluid before it is pumped back down the wellbore.

A powering system, which in most modern rigs includes diesel generators (not shown), provides power for all of the machinery on the drilling rig. The powering system may typically include from one to six (or more) diesel generator units depending on the power requirements of the machinery on the drilling rig. The hoisting system (draw works 7), the circulating system (mud pumps 4), and the rotating system (top-drive or rotary table 20) are the major power consumers on the drilling rig, and these systems may subsequently be collectively referred to as the "tools." Those skilled in the art will understand additional power consuming machinery may be on the drilling rig as well.

During operation of the drilling rig, there may be situations when the power requirement of the tools exceeds the power generation capacity of the generators (also referred to as an "overload condition"), which may lead to power shutdowns or blackouts on the drilling rig. Alternatively, power generation capacity of the generators may also suddenly decrease if a generator shuts down (or goes offline), which also may lead to an overload condition.

SUMMARY OF THE DISCLOSURE

In general, in one aspect, embodiments disclosed herein relate to a control system and methods of regulating and/or limiting the power available to multiple tools on the drilling rig.

In general, in one aspect, embodiments disclosed herein relate to a power consumption limiting method for a plurality of tools on a drilling rig, the method comprising: determining an individual power consumption for each of the plurality of tools; calculating a total power consumption from each respective individual power consumption of the plurality of tools; comparing the total power consumption of the plurality of tools to a total available power; ranking each respective individual power consumption by load size; and reducing power available to at least one of the plurality of tools based on rank when the total power consumption exceeds the total available power.

In general, in one aspect, embodiments disclosed herein relate to a power limiting control system comprising: at least one power generator configured to provide power to a plurality of tools on a drilling rig; a power limiting controller configured to control the provision of power from the power generator to the plurality of tools; wherein the power limiting controller is adapted to perform a method comprising: determining an individual power consumption for each of the plurality of tools; calculating a total power consumption from each respective individual power consumption of the plurality of tools; comparing the total power consumption of the plurality of tools to a total available power; ranking each respective individual power consumption by load size; and reducing power consumption of at least one of the plurality of tools based on rank when the total power consumption exceeds the total available power.

Other aspects and advantages of the invention will be apparent from the following description and the appended claims.

DETAILED DESCRIPTION

Embodiments of the present invention will be described below with reference to the figures. In one aspect, embodiments disclosed herein relate to power consumption limiting methods and apparatuses for regulating and/or limiting the power available to multiple tools on a drilling rig. It may be necessary to regulate and/or limit the power consumed by the tools on a drilling rig based on the amount of available power in order to avoid power shutdowns or blackouts due to overload conditions.

The power limiting methods of embodiments disclosed herein may be capable of managing power provided from multiple generator units, each of which may have different power ratings. While exemplary methods of power management for up to five tools are discussed below, those skilled in the art in possession of the present disclosure will appreciate that embodiments may be capable of handling an unlimited number of tools using the methods of power management described below.

Figure 1:
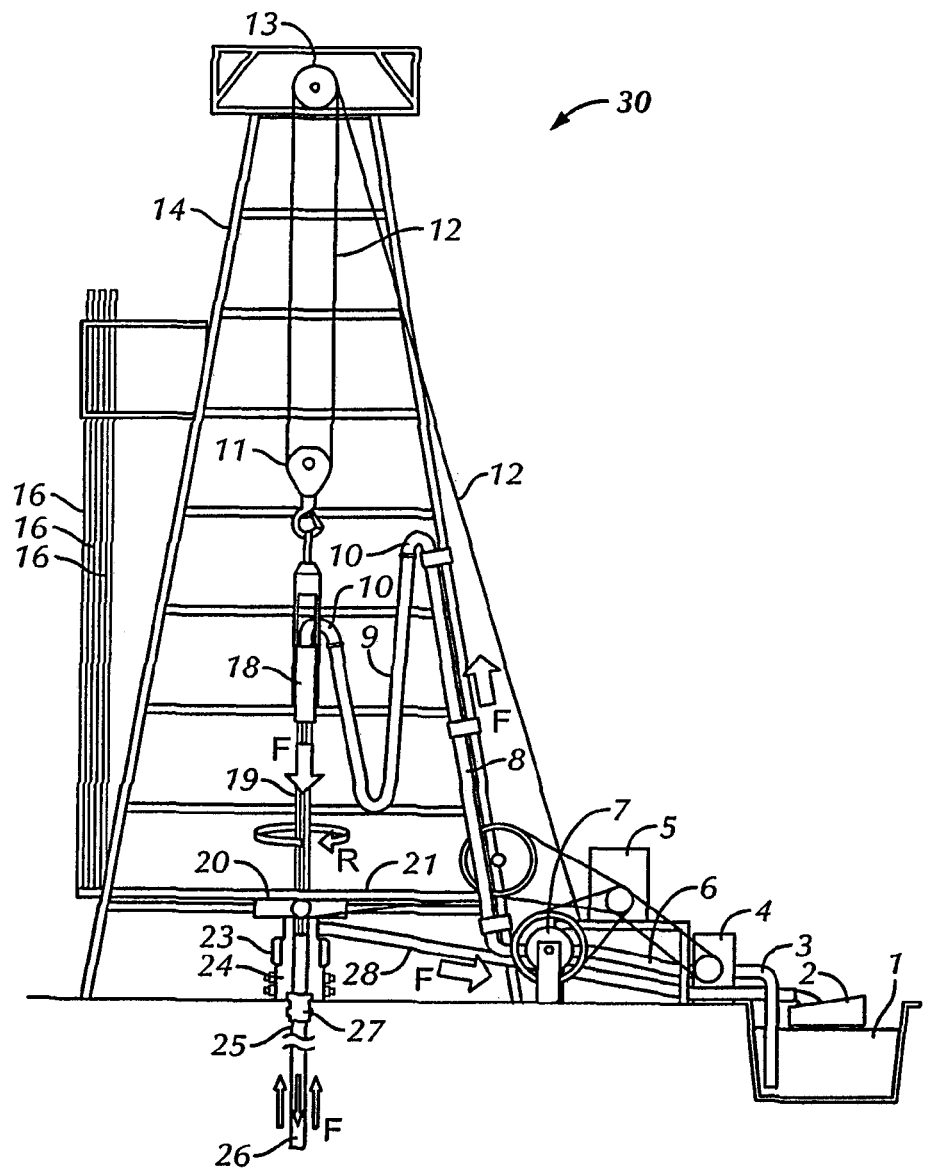
FIG. 1 shows a conventional drilling rig.
Figure 2:
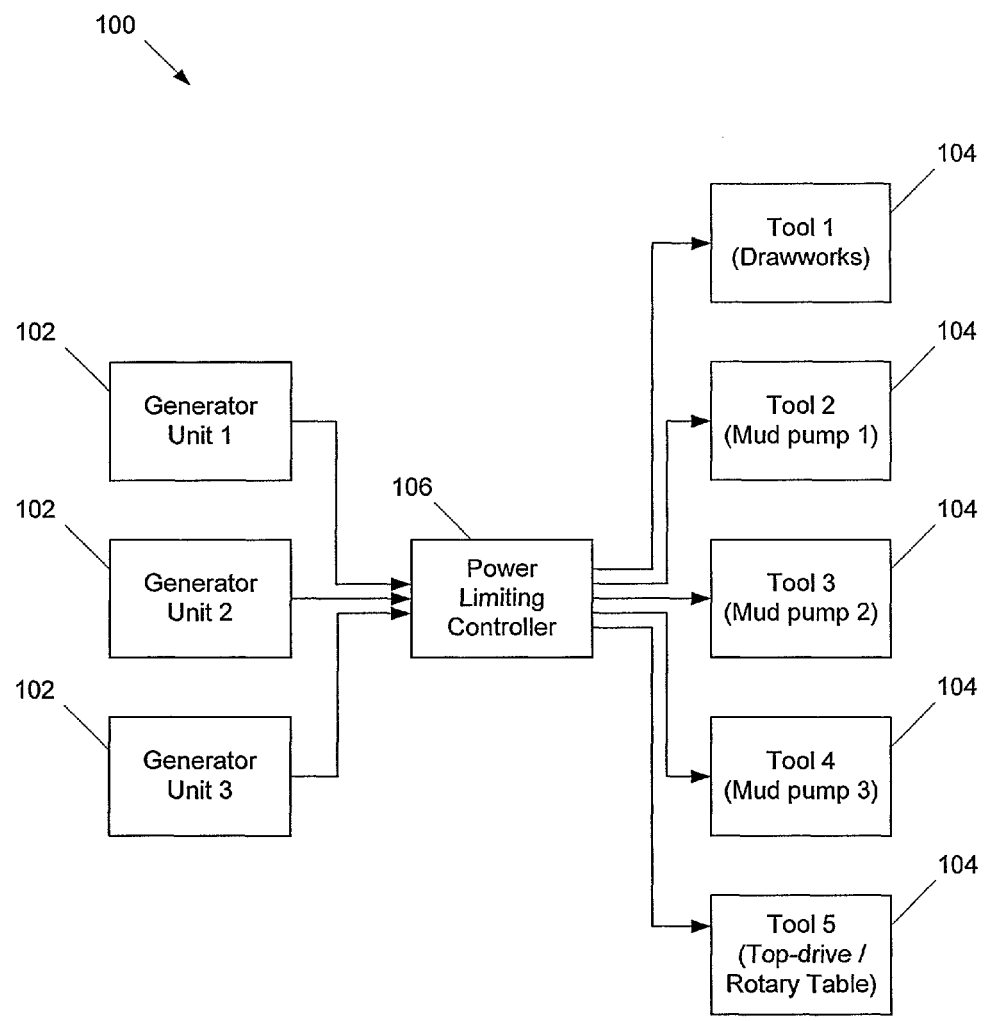
FIG. 2 shows a schematic diagram illustrating a power limiting control system in accordance with one or more embodiments.

Referring to FIG. 2, a simplified schematic diagram illustrating a power limiting control system 100 for a multiple generator and multiple tool system in accordance with embodiments of the present disclosure is shown. The power limiting control system includes multiple generators 102, multiple power consuming tools 104, and a power limiting controller 106. As shown, the multiple tools 104 controlled by the power limiting controller 106 may be, for example, the draw works, three mud pumps (mud pumps one, two, and three), and the rotary table or top drive.

Figure 3:
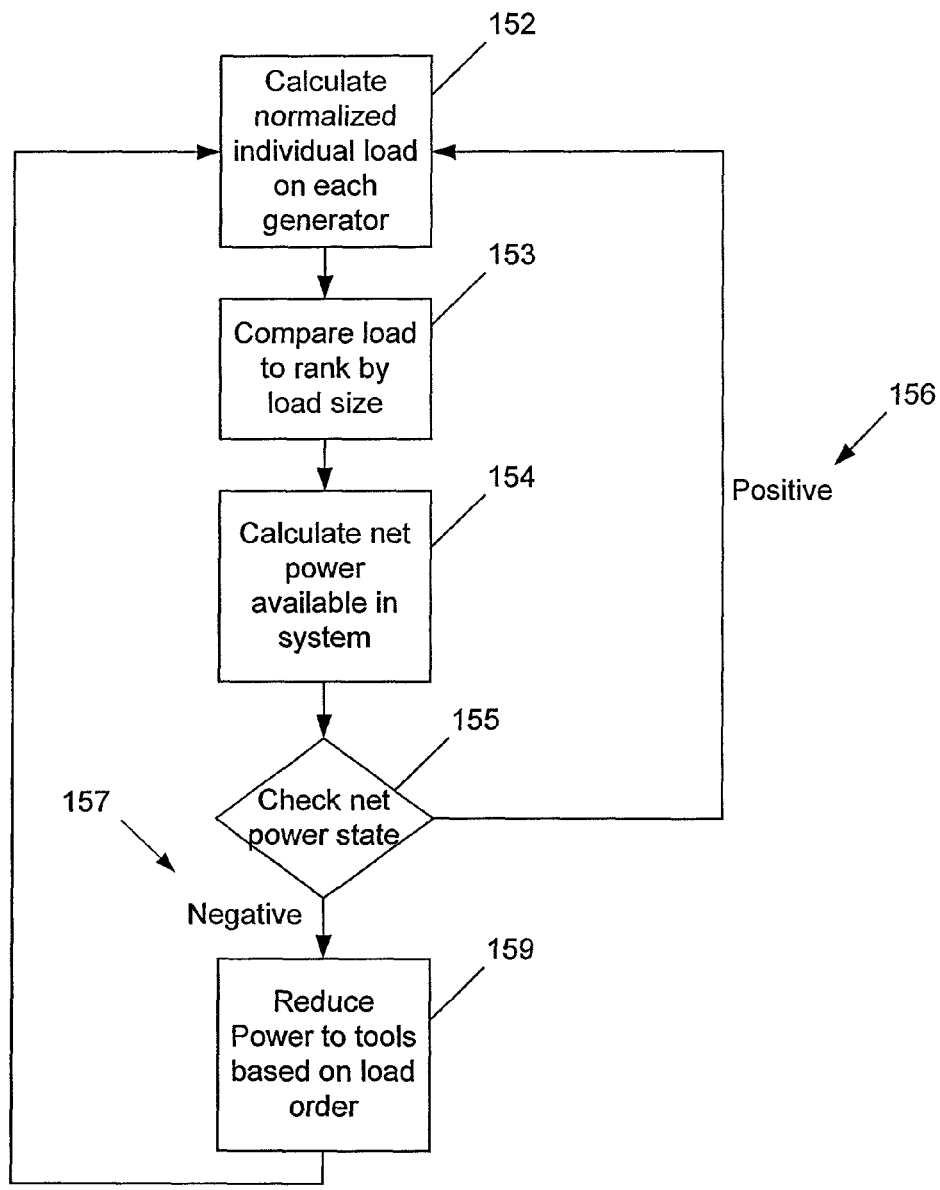
FIG. 3 shows a flow chart diagram illustrating power limiting methods in accordance with one or more embodiments.

In one or more embodiments, the power provided to the multiple tools is controlled by the power limiting controller in accordance with the method shown in FIG. 3. As shown, an individual load on each of the power generators is calculated 152 and compared 153 so that the loads from each of the multiple tools can be ranked by a load size (e.g., the tools may be ranked from highest power consumer to lowest power consumer). Based on the respective loads of the multiple tools, a net power available in the system is calculated 154. Next, the state of the net power is checked 155. If the net power available in the system is positive 156, the system may be characterized as in an "under load" condition, and no power limiting is required. However, if the net power available in the system is negative 157, the system may be characterized as in an "overload" condition, and a reduction of power to the multiple tools is commenced 159 in an order based on load size (e.g., highest to lowest).

Figure 4:
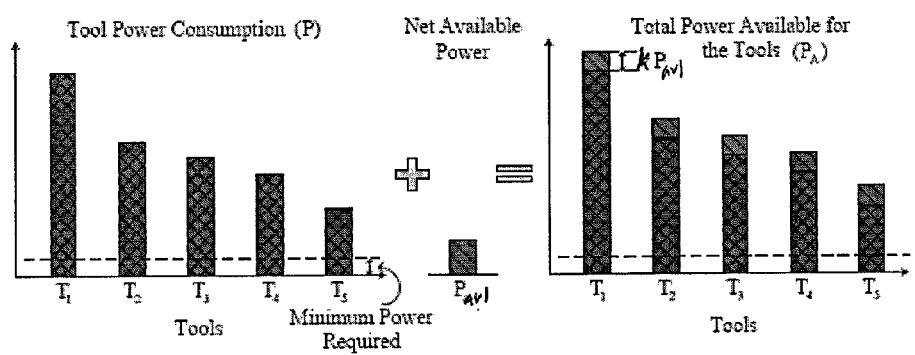
FIG. 4 shows a bar graph illustrating the power limiting controller in State 0 in accordance with one or more embodiments.

A specific example of the manner in which the power to the multiple tools can be reduced in one or more embodiments is set forth below. Referring to FIG. 4, a bar graph illustrating the power limiting controller in State 0, or when the power limiting controller is inactive, in accordance with one or more embodiments is shown. Initially, a normalized individual load on each generator may be calculated by taking a ratio of the generator power and a corresponding rated generator power. These individual loads are then compared and the largest load is selected as a system load.

Next, a net power available in the system is calculated by subtracting the system load from a threshold value (set at unity) and multiplying this value with the maximum available generator power. The maximum available generator power is the sum of all the individual rated powers of the generators.

If the net available power is positive, then the system is in an "underload" condition with additional power available for the tools. The total power available to each tool is calculated by adding a percentage of the net available power to their respective tool power consumption values given as feedback. For example, for five tools $T_1$, $T_2$, $T_3$, $T_4$, and $T_5$ with present power consumption values of $P(T_1)$, $P(T_2)$, $P(T_3)$, $P(T_4)$, and $P(T_5)$, respectively, if the net available power $P_{avl}$ is positive, then, the total power available ($P_A$) for each tool is given by the following expressions.

$$P_A(T_1)=P(T_1)+kP_{avl} \quad (1)$$

$$P_A(T_2)=P(T_2)+kP_{avl} \quad (2)$$

$$P_A(T_3)=P(T_3)+kP_{avl} \quad (3)$$

$$P_A(T_4)=P(T_4)+kP_{avl} \quad (4)$$

$$P_A(T_5)=P(T_5)+kP_{avl} \quad (5)$$

The constant k is a percentage (range=0 to 1).

On the contrary, if the net available power is negative, then the system is in an "overload" condition and the power limiting controller is activated. The negative net available power is the amount by which the total tool power consumption must be reduced to bring the system out of the overload condition.

Initially, the total power available to the top consumer may be reduced until reaching the level of the second highest consumer. Then, both the top consumer and the second highest consumer powers are brought down until reaching the level of the third highest consumer. Once that level is reached for the top two consumers, the available power to the top three consumers is reduced to a level of the fourth highest consumer, and so on. Thus, there are five manners in which the total available power is brought down based on the amount of power reduction required and the individual power consumption of the tools. In one or more embodiments, these five different manners are referred to as machine states and each state is discussed in detail below with respect to FIGS. 5-9.

Figure 5:
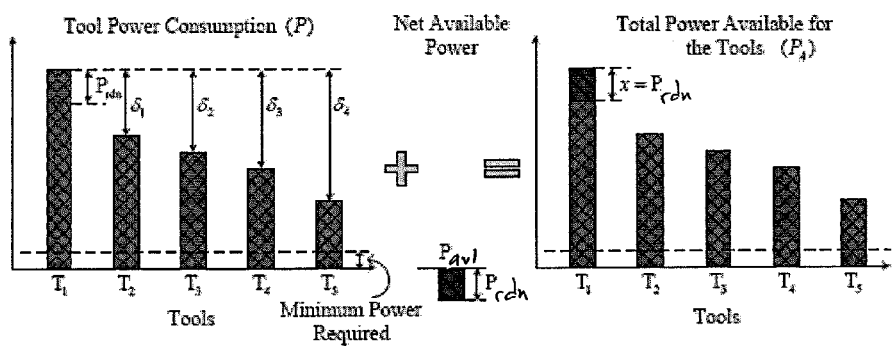
FIG. 5 shows a bar graph illustrating the power limiting controller in State 1 in accordance with one or more embodiments.

FIG. 5 is a bar graph that illustrates the power limiting controller in State 1 in accordance with one or more embodiments. In certain embodiments, $T_1$ to $T_5$ have a descending order of power consumption with tool $T_1$ being the highest consumer and $T_5$ being the lowest. Differences in power consumption between the top consumer and the remaining tools to be $\delta_1$, $\delta_2$, $\delta_3$, and $\delta_4$. Note, $\delta_1$ is the difference in power between the top consumer and the second highest consumer, $\delta_2$ is the difference between the top consumer and third highest consumer, and so on. The power reduction required is the absolute vale of the negative net available power and is given by $P_{rdn}$.

If the power reduction required ($P_{rdn}$) is less than the difference in power consumption between top consumer and the second highest consumer ($\delta_1$), then the system is said to be in State 1 and the total available power to the highest consumer is reduced. In other words, the highest consumer must retain its status as the top consumer even after the power reduction. The condition for State 1 may be mathematically written as:

$$P_{rdn} < \delta_1 \rightarrow \text{State 1}$$

The expression for the total available power for the top consumer may be written as:

$$P_A(T_1) = P(T_1) - P_{rdn} \quad (6)$$

The power available to the rest of the tools are frozen, that is:

$$P_A(T_2) = P(T_2) \quad (7)$$

$$P_A(T_3) = P(T_3) \quad (8)$$

$$P_A(T_4) = P(T_4) \quad (9)$$

$$P_A(T_5) = P(T_5) \quad (10)$$

Figure 6:
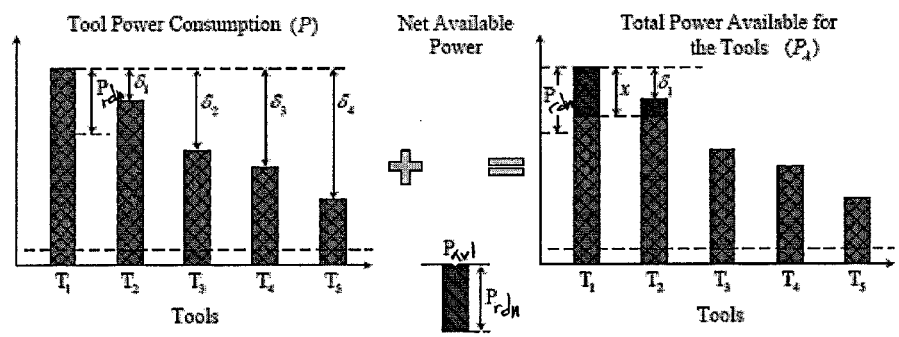
FIG. 6 shows a bar graph illustrating the power limiting controller in State 2 in accordance with one or more embodiments.

Referring now to FIG. 6, a bar graph illustrating the power limiting controller in State 2 in accordance with one or more embodiments is shown. The power limiting control is said to be in the State 2, if the power reduction require ($P_{rdn}$) is greater than $\delta_1$ and the total power available to the top two consumers are reduced. This state is illustrated in FIG. 5. After the power reduction, the available powers to the top two consumers are the same as shown in FIG. 5. If x and $(x-\delta_1)$ are set as the amount by which the top two consumers are reduced, then, the power reduction required ($P_{rdn}$) may be written as:

$$P_{rdn} = x + (x - \delta_1) \quad (11)$$

Solving the above equation for x gives:

$$x = \frac{(P_{rdn} + \delta_1)}{2} \quad (12)$$

Using the x value given in Eq. (12), the total available power to the top two consumers may be written as:

$$P_A(T_1) = P(T_1) - \frac{(P_{rdn} + \delta_1)}{2} \quad (13)$$

$$P_A(T_2) = P(T_2) - \left(\left(\frac{P_{rdn} + \delta_1}{2} - \delta_1\right)\right) \quad (14)$$
$$= P(T_2) - \frac{(P_{rdn} - \delta_1)}{2}$$

The total powers available to the rest of the tools are kept frozen at their current power consumption values.

Figure 7:
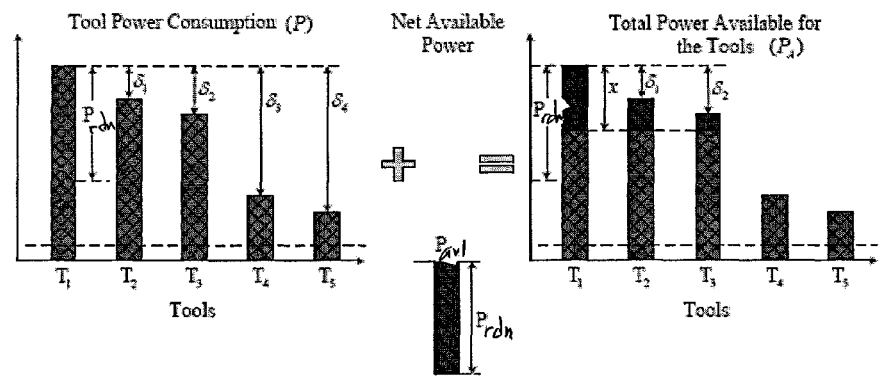
FIG. 7 shows a bar graph illustrating the power limiting controller in State 3 in accordance with one or more embodiments.

Referring now to FIG. 7, a bar graph illustrating the power limiting controller in State 3 in accordance with one or more embodiments is shown. The power limiting controller is said to be in State 3, if the following condition is true:

$$\frac{(P_{rdn} + \delta_1)}{2} > \delta_2 \rightarrow \text{State 3}$$

In State 3, the available powers to the top three consumers may be reduced and brought to the same level as shown in FIG. 6. If x, $(x-\delta_1)$ and $(x-\delta_2)$ are set as the amount by which the top three consumers are reduced, then, the power reduction required ($P_{rdn}$) may be written as:

$$P_{rdn} = x + (x - \delta_1) + (x - \delta_2) \quad (15)$$

Solving the above equation for x gives:

$$x = \frac{(P_{rdn} + \delta_1 + \delta_2)}{3} \quad (16)$$

Using the x value given in Eq. (16), the total available power to the top three consumers may be written as:

$$P_A(T_1) = P(T_1) - \frac{(P_{rdn} + \delta_1 + \delta_2)}{3} \quad (17)$$

$$P_A(T_2) = P(T_2) - \left(\frac{P_{rdn} + \delta_1 + \delta_2}{3} - \delta_1\right) \quad (18)$$
$$= P(T_2) - \left(\frac{P_{rdn} - 2\delta_1 + \delta_2}{3}\right)$$

$$P_A(T_3) = P(T_3) - \left(\frac{P_{rdn} + \delta_1 + \delta_2}{3} - \delta_2\right) \quad (19)$$
$$= P(T_3) - \left(\frac{P_{rdn} + \delta_1 - 2\delta_2}{3}\right)$$

The total power available to the rest of the tools is kept frozen at their current power consumption values.

Figure 8:
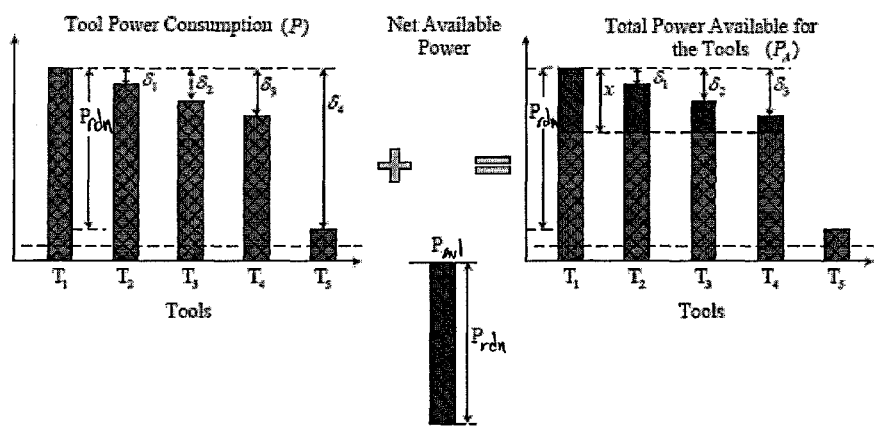
FIG. 8 shows a bar graph illustrating the power limiting controller in State 4 in accordance with one or more embodiments.

Now referring to FIG. 8, a bar graph illustrating the power limiting controller in State 4 in accordance with one or more embodiments is shown. The power limiting controller is said to be in State 4, if:

$$\left(\frac{P_{rdn} + \delta_1 + \delta_2}{3}\right) > \delta_3 \rightarrow \text{State 4}$$

In State 4, the available power to the top four consumers is reduced and brought to the same level as shown in FIG. 7. If x, $(x-\delta_1)$, $(x-\delta_2)$, and $(x-\delta_3)$ are set as the amount by which the top four consumers are reduced, then, the power reduction required ($P_{rdn}$) may be written as:

$$P_{rdn} = x + (x - \delta_1) + (x - \delta_2) + (x - \delta_3) \quad (20)$$

Solving the above equation for x gives:

$$x = \frac{(P_{rdn} + \delta_1 + \delta_2 + \delta_3)}{4} \quad (21)$$

Using the x value given in Eq. (21), the total available power to the top four consumers may be written as:

$$P_A(T_1) = P(T_1) - \left(\frac{(P_{rdn} + \delta_1 + \delta_2 + \delta_3)}{4}\right) \quad (22)$$

$$P_A(T_2) = P(T_2) - \left(\frac{(P_{rdn} + \delta_1 + \delta_2 + \delta_3)}{4 - \delta_1}\right) \quad (23)$$

$$= P(T_2) - \left(\frac{(P_{rdn} - 3\delta_1 + \delta_2 + \delta_3)}{4}\right)$$

$$P_A(T_3) = P(T_3) - \left(\frac{(P_{rdn} + \delta_1 + \delta_2 + \delta_3)}{4 - \delta_2}\right) \quad (24)$$

$$= P(T_3) - \left(\frac{(P_{rdn} + \delta_1 - 3\delta_2 + \delta_3)}{4}\right)$$

$$P_A(T_4) = P(T_4) - \left(\frac{(P_{rdn} + \delta_1 + \delta_2 + \delta_3)}{4 - \delta_3}\right) \quad (25)$$

$$= P(T_4) - \left(\frac{(P_{rdn} + \delta_1 + \delta_2 - 3\delta_3)}{4}\right)$$

The total power available to the fifth tool is kept frozen at its current power consumption value.

Figure 9:
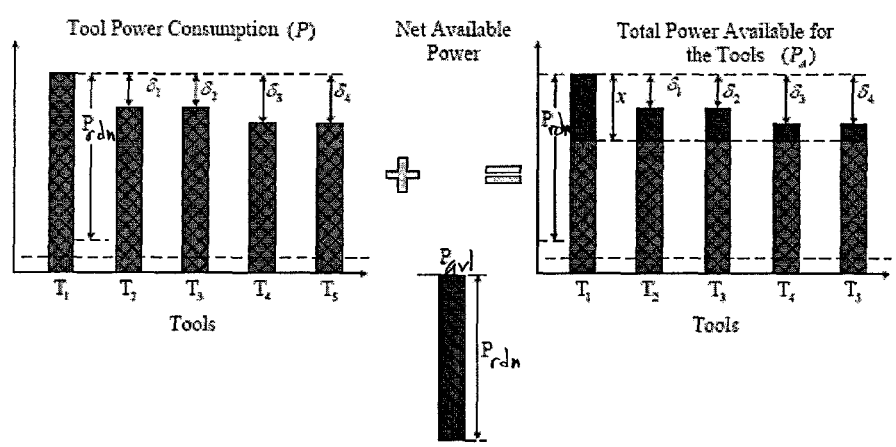
FIG. 9 shows a bar graph illustrating the power limiting controller in State 5 in accordance with one or more embodiments.

Referring now to FIG. 9, a bar graph illustrating the power limiting controller in State 5 in accordance with one or more embodiments is shown. In State 5 of the power limiting controller, the available powers to all the tools are reduced and brought to the same level. The condition for entering State 5 is given below:

$$\frac{(P_{rdn} + \delta_1 + \delta_2 + \delta_3)}{3} > \delta_4 \rightarrow \text{State 5}$$

If x, (x−$\delta_1$), (x−$\delta_2$), (x−$\delta_3$), and (x−$\delta_4$) are set as the amount by which the top five consumers are reduced, then, the power reduction required ($P_{rdn}$) may be written as:

$$P_{rdn} = x + (x - \delta_1) + (x - \delta_2) + (x - \delta_3) + (x - \delta_4) \quad (26)$$

Solving the above equation for x gives:

$$x = \frac{(P_{rdn} + \delta_1 + \delta_2 + \delta_3 + \delta_4)}{5} \quad (27)$$

Using the x value given in Eq. (27), the total available power to the top five consumers may be written as:

$$P_A(T_1) = P(T_1) - \left(\frac{(P_{rdn} + \delta_1 + \delta_2 + \delta_3 + \delta_4)}{5}\right) \quad (28)$$

$$P_A(T_2) = P(T_2) - \left(\frac{(P_{rdn} + \delta_1 + \delta_2 + \delta_3 + \delta_4)}{5 - \delta_1}\right) \quad (29)$$

$$= P(T_2) - \left(\frac{(P_{rdn} - 4\delta_1 + \delta_2 + \delta_3 + \delta_4)}{5}\right)$$

$$P_A(T_3) = P(T_3) - \left(\frac{(P_{rdn} + \delta_1 + \delta_2 + \delta_3 + \delta_4)}{5 - \delta_2}\right) \quad (30)$$

$$= P(T_3) - \left(\frac{(P_{rdn} + \delta_1 - 4\delta_2 + \delta_3 + \delta_4)}{5}\right)$$

$$P_A(T_4) = P(T_4) - \left(\frac{(P_{rdn} + \delta_1 + \delta_2 + \delta_3 + \delta_4)}{5 - \delta_3}\right) \quad (31)$$

$$= P(T_4) - \left(\frac{(P_{rdn} + \delta_1 + \delta_2 - 4\delta_3 + \delta_4)}{5}\right)$$

$$P_A(T_5) = P(T_5) - \left(\frac{(P_{rdn} + \delta_1 + \delta_2 + \delta_3 + \delta_4)}{5 - \delta_4}\right) \quad (32)$$

$$= P(T_5) - \left(\frac{(P_{rdn} + \delta_1 + \delta_2 + \delta_3 - 4\delta_4)}{5}\right)$$

Figure 10:
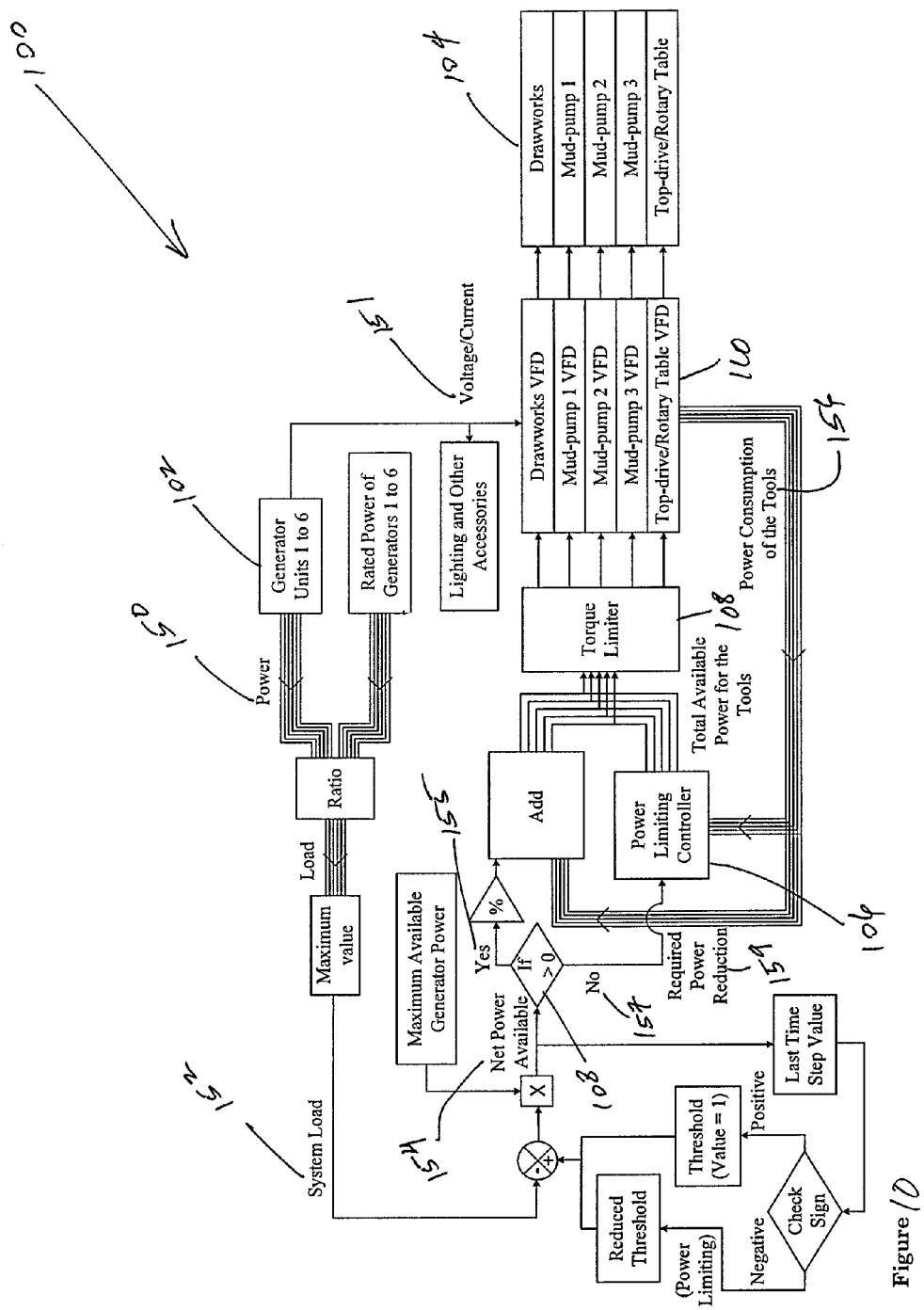
FIG. 10 shows an example schematic diagram illustrating a power limiting control system in accordance with one or more embodiments.

As an illustrative example of a power limiting control system, FIG. 10 shows a detailed schematic diagram of a power limiting control system 100 for a multiple generator and multiple tool system in accordance with one or more embodiments. As previously described, the power limiting control system 100 includes multiple generators 102, multiple tools 104, and a power limiting controller 106. In addition, the power limiting control system may further include a torque limiter 108 and multiple tool variable frequency drives ("VFD") 110. As shown, in this example, the multiple tools 104 controlled by the power limiting controller 106 are, for example, the draw works, three mud-pumps (mud pumps one, two, and three), and the rotary table or top-drive. As shown, additional power consuming equipment on the drilling rig may include lighting and other accessories as understood by those skilled in the art.

Individualized loads on each generator may be determined 150 and a resulting system load 152 is determined by taking a ratio of the tool power consumption (power provided to the multiple tools 151 is known) and a rated generator power. Based on the net power available 154, a decision is made (decision block 108 of power limiting controller 106) on whether to activate the power limiting controller 106.

For a positive net power available 155 (i.e., net power available>0), the power limiting controller 106 is bypassed and the power is supplied to the multiple tools as is. However, for a negative power available 157 (i.e., net power available<0), the power limiting controller 106 is activated to implement a required power reduction 159. The power limiting controller 106 reduces power using methods described above, namely reducing power to the multiple tools from a highest power consuming tool to a lowest. In particular, to implement the power reduction for each tool, the power limiting controller 106 sets the torque limit for the motors driving the tools through their respective VFD's 110. The torque limit caps the amount of torque produced by the motors, and, thus, power consumed, which is directly proportional to the torque, is regulated. A torque limiting method is described in detail later in the application. Continuous feedback 156 on the power consumption of the tools provides real time feedback to the power limiting controller 106, which allows for real time adjustments to the power consumption of multiple tools, as required.

Next, an example of a specific drilling rig tool power consumption and power generation is provided to facilitate understanding of the power limiting controller concepts employed in one or more embodiments.

In this example, the drilling rig includes three generator units online with a rated capacity of 1000 horsepower ("HP") each. Thus, maximum available generator power: 1000+1000+1000=3000 HP. There are four tools with the following respective present power consumption: Mud pump one (MP1)=710 HP, Mud pump two (MP2)=695 HP, Mud pump three (MP3)=705 HP, and draw works (DW)=390 HP. Thus, total tool power consumption: 710+695+705+390=2500 HP. Assuming, for purposes of this example, that only these four tools are connected to the generators and there is not other loss, the system load is given by: Load=2500/3000=0.83. Next, the net available power is calculated as:

Net.available.power = (Threshold − Load) ∗ Max.available.*gen*.power $$= (1 − 0.83) ∗ 3000 = 500 \text{ HP}$$

Thus, the net available power is positive and system is in State 0, i.e., power limiting control is not active. The system is in normal operating condition with 83.33% generator load.

If one of the generator units fails, then, the maximum available generator power will drop, i.e., maximum available generator power=1000+1000=2000 HP. However, the total tool power consumption remains the same, i.e., total tool power consumption=710+695+705+390=2500 HP. Thus, the system load is given by: Load=2500/2000=1.25. Accordingly, the system is in overload condition and the net available power is calculated to be:

Net.available.power = (Threshold − Load) ∗ Max.available.*gen*.power $$= (1 − 1.25) ∗ 2000 = −500 \text{ HP}$$

The net available power is negative and the system enters the power limiting mode. In the power limiting mode, a reduced value of the threshold is used. So, the net available power is recalculated as follows:

Net.available.power = (reduced.threshold − load) ∗ Max.available.*gen*.power $$= (0.9 − 1.25) ∗ 2000 = −700 \text{ HP}$$

Thus, the total power reduction required is:

$P_{rdn}$=700 HP

Rearranging the tools in the descending order of power consumption results in:

$T_1$=MP1→$P(T_1)$=710 HP $T_2$=MP2→$P(T_2)$=705 HP $T_3$=MP3→$P(T_3)$=695 HP $T_4$=MP4→$P(T_4)$=390 HP

The difference in power consumption between the top consumer and the rest of the tools is given by:

$\delta_1 = P(T_1) − P(T_2) = 5$ $\delta_2 = P(T_1) − P(T_3) = 15$ $\delta_3 = P(T_1) − P(T_4) = 320$ The system satisfies the following conditions:

$$\frac{P_{rdn} + \delta_1}{2} = 352.5 > 15 = \delta_2$$

$$\frac{P_{rdn} + \delta_1 + \delta_2}{3} = 240 < 320 = \delta_3$$

Hence, the system is in State 3 and the available power to the top three consumers is reduced. The power to the top consumer is reduced by the value x, which is calculated to be:

$$x = \frac{(P_{rdn} + \delta_1 + \delta_2)}{3} = 240$$

Therefore, the total available power to the top three consumers is:

$$P_A(T_1) = P(T_1) − x$$
$$= 710 − 240$$
$$= 470 \text{ HP}$$

$$P_A(T_2) = P(T_2) − (x − \delta_1)$$
$$= 705 − (240 − 5)$$
$$= 470 \text{ HP}$$

$$P_A(T_3) = P(T_3) − (x − \delta_2) 695 − (240 − 15)$$
$$= 470 \text{ HP}$$

The total available power to the fourth tool is kept frozen at is current power consumption value and is given by:

$P_A(T_4) = P(T_4) = 390$ HP

Figure 11:
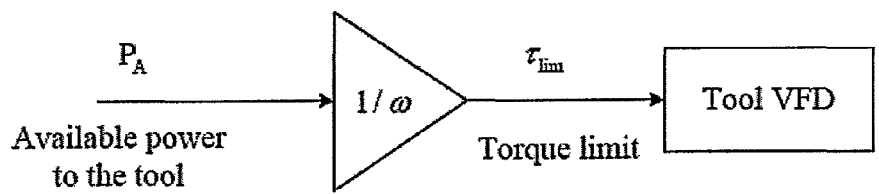
FIG. 11 shows a block diagram for calculating a torque limit in accordance with one or more embodiments.

Methods used to limit the amount of torque available to each of the power consumers are now described in more detail. Based on the available power to each tool ($P_A$) and the corresponding motor velocity ($\omega$), a torque limit ($\tau_{lim}$) for each tool may be calculated as follows:

$$\tau_{lim}(T_1) = \frac{P_A(T_1)}{\omega(T_1)} \tag{33}$$

Where $\tau_{lim}(T_1)$ is the torque limit, $P_A(T_1)$ is the available power, and $\omega(T_1)$ is the motor velocity for tool 1. The torque limits for the other tools may be calculated in a similar manner. FIG. 11 illustrates a representative block diagram for calculating the torque limit. For the drawworks, in addition to the torque limit, a limit is placed on the acceleration of the motor ($\alpha_{max}$). The limit may be derived as follows. The mechanical power ($P_m$) produced by the draw works is given by:

$$P_m = \tau \omega \tag{34}$$

Where, $\tau$ is the torque produced by the drawworks and $\omega$ is its angular velocity. The expression for torque $\tau$ is given by:

$$\tau = \tau_L + J_D \alpha \tag{35}$$

Where, $\tau_L$ is the constant load torque acting on the drawworks, $J_D$ is the moment of inertia of the drawworks and $\alpha$ is the angular acceleration of the drawworks. The torque due to friction is assumed to be negligible compared to the load torque, and thus, is neglected. Substituting the torque given in Equation 35 into the mechanical power equation give in Equation 34 yields:

$$P_m = (\tau_L + J_D \alpha) \omega \tag{36}$$
$$= \tau_L \omega + J_D \alpha \omega$$

In Equation 36, the first term, $\tau_L \omega$, represents the steady state power and the second term, $J_D \alpha \omega$, represents the additional power due to the rate of change in the internal kinetic energy of the system. Further, P represents the electrical power supplied by the generator to the drawworks. The relationship between electric power (P) and mechanical power ($P_m$) is shown as:

$$P = P_m + \text{conversion.losses} \quad (37)$$

Conversion losses are assumed to be constant. Differentiating the equation given in Equation 37 with respect to time, t, gives:

$$\frac{dP}{dt} = \frac{dP_m}{dt} \quad (38)$$
$$= \tau L \frac{d\omega}{dt} + J_D \alpha \frac{d\omega}{dt} + J_D \frac{d\alpha}{dt} \omega$$
$$= \tau_L \alpha + J_D \alpha^2 + J_D \omega \frac{d\alpha}{dt}$$

Figure 12:
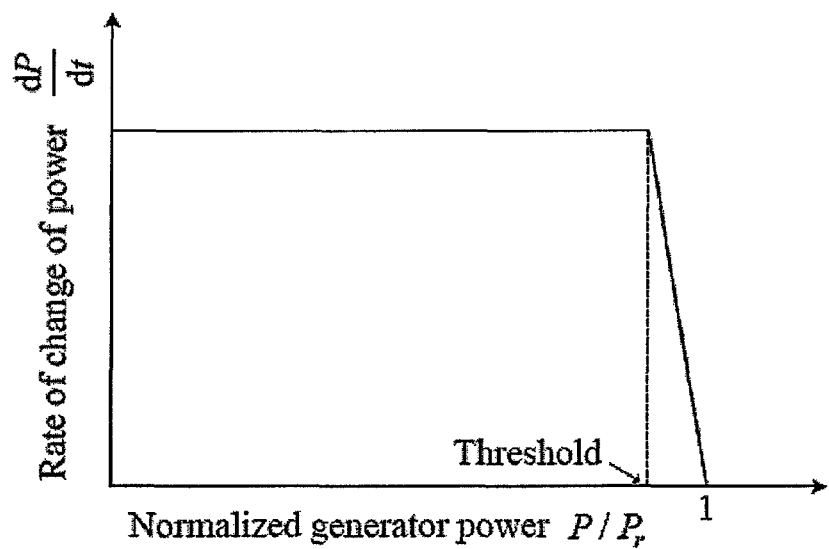
FIG. 12 shows a line graph illustrating showing the allowable rate of change of generator power and the normalized generator power in accordance with one or more embodiments.

The allowable rate of change of the electric power (dP/dt) of the generator is determined by the power limit controller and is a constant at any given instant of time. In the power limit controller, the allowable rate of change of power (dP/dt) is set based on the normalized power or load. A typical graph between the allowable rate of change of generator power and the normalized generator power (or power normalized with respect to rated power of generator ($P_r$), i.e., load) is shown in FIG. 12.

As shown in the figure, the allowable rate of change of generator power is reduced to zero beyond the rated power. That is, no additional power is available after the rated power of the generator has been reached. If the generator power is within the threshold value (0.8) then the allowable rate of change of power has a constant value. When the generator power is between the threshold value and the rated power, the allowable rate of change of power is reduced to zero.

The goal is to find the maximum allowable angular acceleration ($\alpha_{max}$) based on the current allowable rate of change of generator power determined by the power limit controller. The maximum allowable angular acceleration ($\alpha_{max}$) is calculated at every time step. Considering the equation for rate of change in power given in Equation 38 and assuming the angular acceleration ($\alpha$) is a constant, the term involving the jerk ($d\alpha/dt$) will be there momentarily while the angular acceleration goes from zero to a constant value, and thereafter will be zero. Thus, this term ($J_D \omega (d\alpha/dt)$) may be neglected and the rate of change in power equation given in Equation 38 can be rewritten as:

$$\frac{dP}{dt} = \tau_L \alpha + J_D \alpha^2 \quad (39)$$

For a constant dP/dt, Equation 39 reduces to a quadratic equation in $\alpha$. This equation can be solved to set the maximum allowable angular acceleration ($\alpha_{max}$) as:

$$\alpha_{max} = \frac{-\tau_L \pm \sqrt{\tau_L^2 + 4 J_D \frac{dP}{dt}}}{2 J_D} \quad (40)$$

Figure 13:
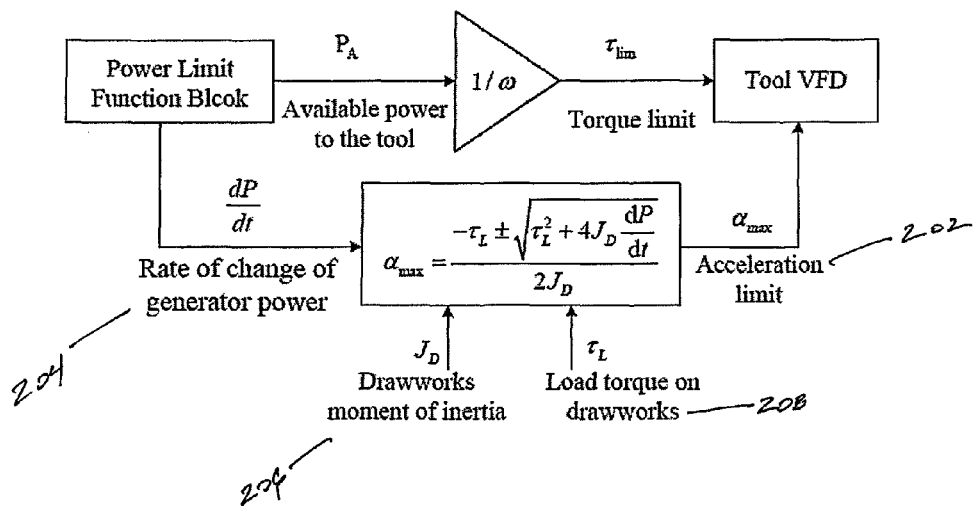
FIG. 13 shows a block diagram for calculating the torque limit and acceleration limit for the drawworks in accordance with one or more embodiments.

FIG. 13 illustrates a block diagram for calculating the torque limit and acceleration limit for the drawworks. As shown, a maximum allowable angular acceleration limit 202 may be set inputting a rate of change of generator power (dP/dt) 204, drawworks moment of inertia ($J_D$) 206, and a load torque on the drawworks ($\tau_L$) 208.

One or more embodiments of the present invention may provide one or more of the following advantages. Power limiting controllers, in accordance with one or more embodiments, provide methods of avoiding overload conditions (blackouts) by managing power demands from major power consumers (tools) on the drilling rig. In particular, overload conditions may cause damage to the tools or generators causing costly rig downtime and maintenance or equipment replacement costs. In addition, rig downtime causes drilling operations to cease, which is costly. Thus, the power limiting methods disclosed herein may increase drilling efficiency and longevity by avoiding overload conditions.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A power consumption limiting method for a plurality of tools on a drilling rig, the method comprising:
   determining an individual power consumption for each of the plurality of tools;
   calculating a total power consumption from each respective individual power consumption of the plurality of tools;
   comparing the total power consumption of the plurality of tools to a total available power;
   ranking each respective individual power consumption by load size from highest power consumer to lowest power consumer;
   reducing power available to at least one of the plurality of tools based on rank when the total power consumption exceeds the total available power
   reducing power available to a tool of the plurality of tools having a highest rank of power consumption load, hereinafter referred to as a highest load tool; and
   reducing power available to only the highest load tool when a net available generator power value is less than a difference in value between power consumption of the highest load tool and a tool of the plurality of tools having a second highest rank of power consumption load, hereinafter referred to as a second highest load tool.

2. The method of claim 1 further comprising reducing power available to both the highest load tool and the second highest load tool when the net available generator power value is greater than a difference in value between power consumption of the tool of the plurality of tools having a highest rank of power consumption load and a tool of the plurality of tools having a second highest rank of power consumption load.

3. The method of claim 1 further comprising reducing power available to only the highest load tool and the second highest load tool when the net available generator power value is less than a difference in value between a combined power consumption of the highest load tool and second highest load tool and a power consumption of a tool of the plurality of tools having a third highest rank of power consumption load, hereinafter referred to as a third highest load tool.

4. The method of claim 3, further comprising reducing power available to only the highest load tool, the second highest load tool, and the third highest tool when the net available generator power value is less than a difference in value between a combined power consumption of the highest load tool, second highest load tool, and third highest load tool and a power consumption of a tool of the plurality of tools having a fourth highest rank of power consumption load, hereinafter referred to as a fourth highest load tool.

5. The method of claim 1, further comprising reducing power available to the highest load tool until a value of available power to the highest load tool is equal to a tool of the plurality of tools having a second highest rank of power consumption load, hereinafter referred to as a second highest load tool, wherein a power of both the highest load tool and the second highest load tool is reduced equally once available power to the highest load tool and second highest load tool is equal.

6. The method of claim 1, further comprising calculating an instantaneous power consumption value for each of the plurality of tools.

7. The method of claim 1, further comprising determining a net available power by subtracting a system load from a threshold value and multiplying by a maximum available power value.

8. A power limiting control system comprising:
at least one power generator configured to provide power to a plurality of tools on a drilling rig; and
a power limiting controller configured to control the provision of power from the power generator to the plurality of tools;
wherein the power limiting controller is adapted to perform a method comprising:
determining an individual power consumption for each of the plurality of tools;
calculating a total power consumption from each respective individual power consumption of the plurality of tools;
comparing the total power consumption of the plurality of tools to a total available power;
ranking each respective individual power consumption by load size from highest power consumer to lowest power consumer; and
reducing power consumption of at least one of the plurality of tools based on rank when the total power consumption exceeds the total available power;
wherein the power limiting controller is adapted to further perform a method comprising reducing power available to a tool of the plurality of tools having a highest rank of power consumption load, hereinafter referred to as a highest load tool, and
wherein the power limiting controller is adapted to further perform a method comprising reducing power available to only the highest load tool when a net available generator power value is less than a difference in value between power consumption of the highest load tool and a tool of the plurality of tools having a second highest rank of power consumption load, hereinafter referred to as a second highest load tool.

9. The control system of claim 8, wherein the power limiting controller is adapted to further perform a method comprising reducing power available to both the highest load tool and the second highest load tool when the net available generator power value is greater than a difference in value between power consumption of the tool of the plurality of tools having a highest rank of power consumption load and a tool of the plurality of tools having a second highest rank of power consumption load.

10. The control system of claim 8, wherein the power limiting controller is adapted to further perform a method comprising reducing power available to only the highest load tool and the second highest load tool when the net available generator power value is less than a difference in value between a combined power consumption of the highest load tool and second highest load tool and a power consumption of a tool of the plurality of tools having a third highest rank of power consumption load, hereinafter referred to as a third highest load tool.

11. The control system of claim 8, wherein the power limiting controller is adapted to further perform a method comprising reducing power available to only the highest load tool, the second highest load tool, and the third highest tool when the net available generator power value is less than a difference in value between a combined power consumption of the highest load tool, second highest load tool, and third highest load tool and a power consumption of a tool of the plurality of tools having a fourth highest rank of power consumption load, hereinafter referred to as a fourth highest load tool.

12. The control system of claim 8, wherein the power limiting controller is adapted to further perform a method comprising reducing power available to the highest load tool until a value of available power to the highest load tool is equal to a tool of the plurality of tools having a second highest rank of power consumption load, hereinafter referred to as a second highest load tool, wherein a power of both the highest load tool and the second highest load tool is reduced equally once available power to the highest load tool and second highest load tool is equal.

13. The control system of claim 8, further comprising multiple variable frequency drives corresponding to each of the plurality of tools.

14. The control system of claim 13, further comprising a torque limiter configured to limit a maximum amount of torque produced by each of the variable frequency drives corresponding to each of the plurality of tools.

15. The control system of claim 8, further comprising a feedback loop configured to provide an instantaneous power consumption value of each of the plurality of tools to the power limiting controller.

16. The control system of claim 8, wherein the plurality of tools comprises at least one selected from a group consisting of a hoisting system, a circulation system, and a rotary system.

* * * * *